United States Patent
Humad et al.

(10) Patent No.: US 10,891,939 B2
(45) Date of Patent: Jan. 12, 2021

(54) SHARING CONFIDENTIAL INFORMATION WITH PRIVACY USING A MOBILE PHONE

(71) Applicant: International Business Machines Corporation, Armonk, NY (US)

(72) Inventors: Chitwan V. Humad, Bavdhan (IN); Prasanna R. Joshi, Pune (IN)

(73) Assignee: International Business Machines Corporation, Armonk, NY (US)

(*) Notice: Subject to any disclaimer, the term of this patent is extended or adjusted under 35 U.S.C. 154(b) by 82 days.

(21) Appl. No.: 16/199,613

(22) Filed: Nov. 26, 2018

(65) Prior Publication Data
US 2020/0168203 A1    May 28, 2020

(51) Int. Cl.
| | |
|---|---|
| G10L 13/04 | (2013.01) |
| G10L 13/00 | (2006.01) |
| G10L 13/033 | (2013.01) |
| G06F 21/62 | (2013.01) |
| G10L 13/027 | (2013.01) |
| G06F 40/40 | (2020.01) |
| H04M 3/53 | (2006.01) |

(52) U.S. Cl.
CPC .......... *G10L 13/00* (2013.01); *G06F 21/6245* (2013.01); *G06F 40/40* (2020.01); *G10L 13/027* (2013.01); *G10L 13/033* (2013.01); *H04M 3/5322* (2013.01)

(58) Field of Classification Search
CPC .... G10L 13/043; G10L 13/027; G10L 13/033
See application file for complete search history.

(56) References Cited

U.S. PATENT DOCUMENTS

| | | | |
|---|---|---|---|
| 5,287,199 A * | 2/1994 | Zoccolillo | H04M 3/5307 358/400 |
| 6,397,183 B1 * | 5/2002 | Baba | G06F 3/16 704/258 |

(Continued)

OTHER PUBLICATIONS

Mell et al., "Effectively and Securely Using the Cloud Computing Paradigm" dated Oct. 7, 2009, NIST, Information Technology Laboratory, Total 80 pages.
(Continued)

*Primary Examiner* — Parth Patel
(74) *Attorney, Agent, or Firm* — Janaki K. Davda; Konrad, Raynes, Davda and Victor LLP

(57) ABSTRACT

Provided are techniques for sharing confidential information with privacy using a mobile phone. A voice preference and language preferences are received for an information provider profile of an information provider, where the language preferences include a first language for typing text and a second language for speaking the text. During an on-going live phone call between the information provider and an information requester, selection of a text to talk feature is received. Text is received in the first language, where the text includes confidential information. The text is converted from the first language to text in the second language. The text in the second language is converted to a voice message that is spoken in a voice identified by the voice preference through the on-going live phone call to provide the confidential information with privacy. Then, control is returned to the on-going live phone call.

15 Claims, 11 Drawing Sheets

(56) References Cited

U.S. PATENT DOCUMENTS

| | | | | |
|---|---|---|---|---|
| 6,606,373 B1* | 8/2003 | Martin | H04M 3/5307 | 379/88.01 |
| 6,888,929 B1* | 5/2005 | Saylor | H04M 3/487 | 379/114.01 |
| 7,457,397 B1* | 11/2008 | Saylor | H04M 3/4938 | 379/88.17 |
| 7,463,723 B2* | 12/2008 | Davis | H04M 3/53308 | 379/201.1 |
| 7,606,352 B2* | 10/2009 | Cass | H04M 3/42 | 379/75 |
| 7,729,481 B2* | 6/2010 | Thompson | H04L 51/00 | 379/88.13 |
| 7,990,964 B2* | 8/2011 | O'Brien | H04L 12/1859 | 370/392 |
| 8,170,537 B1* | 5/2012 | Bort | H04M 1/65 | 379/88.13 |
| 8,645,575 B1* | 2/2014 | McKnight | H04M 3/567 | 370/260 |
| 8,718,047 B2* | 5/2014 | Vieri | H04M 3/5322 | 370/352 |
| 9,076,435 B2* | 7/2015 | Jones | G10L 13/00 | |
| 9,210,110 B2* | 12/2015 | Maria | H04L 51/066 | |
| 9,311,911 B2* | 4/2016 | Tang | G10L 13/00 | |
| 9,424,840 B1* | 8/2016 | Hart | G10L 15/22 | |
| 10,389,876 B2* | 8/2019 | Engelke | H04M 3/42391 | |
| 10,504,520 B1* | 12/2019 | Roy | G10L 17/22 | |
| 2002/0152255 A1* | 10/2002 | Smith, Jr. | H04M 3/42068 | 718/102 |
| 2006/0161426 A1* | 7/2006 | Ikegami | H04M 1/72522 | 704/201 |
| 2007/0208569 A1* | 9/2007 | Subramanian | G10L 19/0018 | 704/270 |
| 2007/0255554 A1* | 11/2007 | Cai | G10L 13/00 | 704/9 |
| 2007/0260460 A1* | 11/2007 | Hyatt | H04M 1/72547 | 704/260 |
| 2009/0012793 A1* | 1/2009 | Dao | G10L 13/00 | 704/260 |
| 2009/0156240 A1* | 6/2009 | Kirchmeier | G06Q 10/06 | 455/466 |
| 2009/0313007 A1* | 12/2009 | Bajaj | G06F 40/58 | 704/3 |
| 2010/0008479 A1* | 1/2010 | Cho | G06Q 20/102 | 379/88.04 |
| 2010/0057465 A1* | 3/2010 | Kirsch | G01C 21/3629 | 704/260 |
| 2010/0070282 A1* | 3/2010 | Cho | G06Q 30/0603 | 704/260 |
| 2010/0214476 A1* | 8/2010 | Miyamoto | H04N 21/440236 | 348/468 |
| 2011/0111805 A1* | 5/2011 | Paquier | H04M 1/72552 | 455/563 |
| 2012/0215540 A1* | 8/2012 | Goktekin | H04L 51/066 | 704/260 |
| 2012/0259633 A1* | 10/2012 | Aihara | G10L 13/00 | 704/235 |
| 2012/0296654 A1* | 11/2012 | Hendrickson | G10L 13/02 | 704/260 |
| 2013/0238339 A1* | 9/2013 | Fleizach | G06F 40/263 | 704/260 |
| 2014/0122053 A1* | 5/2014 | Lotan | G16H 10/60 | 704/2 |
| 2014/0273974 A1* | 9/2014 | Varghese | H04W 88/06 | 455/412.1 |
| 2015/0154183 A1* | 6/2015 | Kristjansson | H04M 3/56 | 704/3 |
| 2016/0035353 A1* | 2/2016 | Chen | G10L 17/22 | 704/235 |
| 2017/0060850 A1* | 3/2017 | Lewis | G06F 40/47 | |
| 2017/0177560 A1* | 6/2017 | Gueta | G06F 40/129 | |
| 2018/0109665 A1* | 4/2018 | Adderly | H04M 1/7255 | |
| 2018/0359349 A1* | 12/2018 | Graylin | H04M 1/72552 | |
| 2019/0012444 A1* | 1/2019 | Lesso | G06F 21/32 | |
| 2019/0121903 A1* | 4/2019 | Gholap | G06F 16/313 | |
| 2019/0122665 A1* | 4/2019 | Chasney | G10L 15/22 | |
| 2020/0125643 A1* | 4/2020 | Gutierrez | G06F 40/58 | |

OTHER PUBLICATIONS

Mell et al., "The NIST Definition of Cloud Computing" dated Sep. 2011, Computer Security Division Information Technology Laboratory National Institute of Standards and Technology, Total 7 pages.

"RLSpeak™ MEC, Say No To Illegal Eavesdropping", dated May 24, 2016, (online), retrieved from the Internet at URL> http://www.reliaspeak.com/en/2016/05/24/rlsmecrelease/, Total 4 pages.

Seecrypt, "Communicate in Confidence", (online) retrieved from the Internet on Nov. 8, 2018 at URL>https://www.seecrypt.com/, Total 3 pages.

* cited by examiner

SHARING CONFIDENTIAL INFORMATION WITH PRIVACY USING A MOBILE PHONE

BACKGROUND

1. Field of the Invention

Embodiments of the invention relate to sharing confidential information with privacy using a mobile phone. In particular, embodiments enable someone using a smart phone to share confidential information using text to voice conversion and delivery to maintain privacy of content.

2. Description of the Related Art

Within the last 20 to 25 years, mobile phones have become indispensable assets for business and personal communication. Rapid advancement and reliability in mobile phone technology has brought the entire world together as a global village.

The emergence of mobile phone technology has further eased communication and has added mobility in doing business. People now do business on the move, and they no longer need to be tied to a landline at specific location, such as a conference room, a cabin, etc. However, with this ease and mobility in communication, there may be difficulty in having privacy when using the mobile phone in public places.

SUMMARY

In accordance with embodiments, a computer-implemented method is provided for sharing confidential information with privacy using a mobile phone. With the computer-implemented method, a voice preference is received for an information provider profile of an information provider. Language preferences are received for the information provider profile, wherein the language preferences include a first language for typing text and a second language for speaking the text. During an on-going live phone call between the information provider and an information requester, selection of a text to talk feature is received from a mobile phone display screen of a mobile phone. Text in the first language is received, where the text includes confidential information. The text in the first language is converted to text in the second language. The text in the second language is converted to a voice message. The voice message is spoken in a voice identified by the voice preference through the on-going live phone call to provide the confidential information with privacy. Control is returned to the on-going live phone call.

In accordance with other embodiments, a computer program product is provided for sharing confidential information with privacy using a mobile phone. The computer program product comprising a computer readable storage medium having program code embodied therewith, the program code executable by at least one processor to perform operations. A voice preference is received for an information provider profile of an information provider. Language preferences are received for the information provider profile, wherein the language preferences include a first language for typing text and a second language for speaking the text. During an on-going live phone call between the information provider and an information requester, selection of a text to talk feature is received from a mobile phone display screen of a mobile phone. Text in the first language is received, where the text includes confidential information. The text in the first language is converted to text in the second language. The text in the second language is converted to a voice message. The voice message is spoken in a voice identified by the voice preference through the on-going live phone call to provide the confidential information with privacy. Control is returned to the on-going live phone call.

In yet other embodiments, a computer system is provided for sharing confidential information with privacy using a mobile phone. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A voice preference is received for an information provider profile of an information provider. Language preferences are received for the information provider profile, wherein the language preferences include a first language for typing text and a second language for speaking the text. During an on-going live phone call between the information provider and an information requester, selection of a text to talk feature is received from a mobile phone display screen of a mobile phone. Text in the first language is received, where the text includes confidential information. The text in the first language is converted to text in the second language. The text in the second language is converted to a voice message. The voice message is spoken in a voice identified by the voice preference through the on-going live phone call to provide the confidential information with privacy. Control is returned to the on-going live phone call.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In certain embodiments, there is a communication between two parties, a requester (caller-R) and information provider (caller-P). The information requester (caller-R) may request confidential information during a call. The information provider (caller-P) may provide confidential information during the call. At any point during an on-going live phone call, either party may be the information provider or the information requester. In certain embodiments, the information requester may be in a public place and may request confidential information using the text to talk feature.

Embodiments resolve the limitation of privacy over mobile to mobile and mobile to desk phone communications by allowing an information provider on the mobile phone to text confidential information (rather than speak the confidential information). Then, the text may be converted to voice for playback to an information requester of that confidential information (e.g., the individual on the other end of the communication who may be communicating on another mobile phone or on a desk phone). The confidential information may be said to be private information and/or confidential information.

Figure 1:
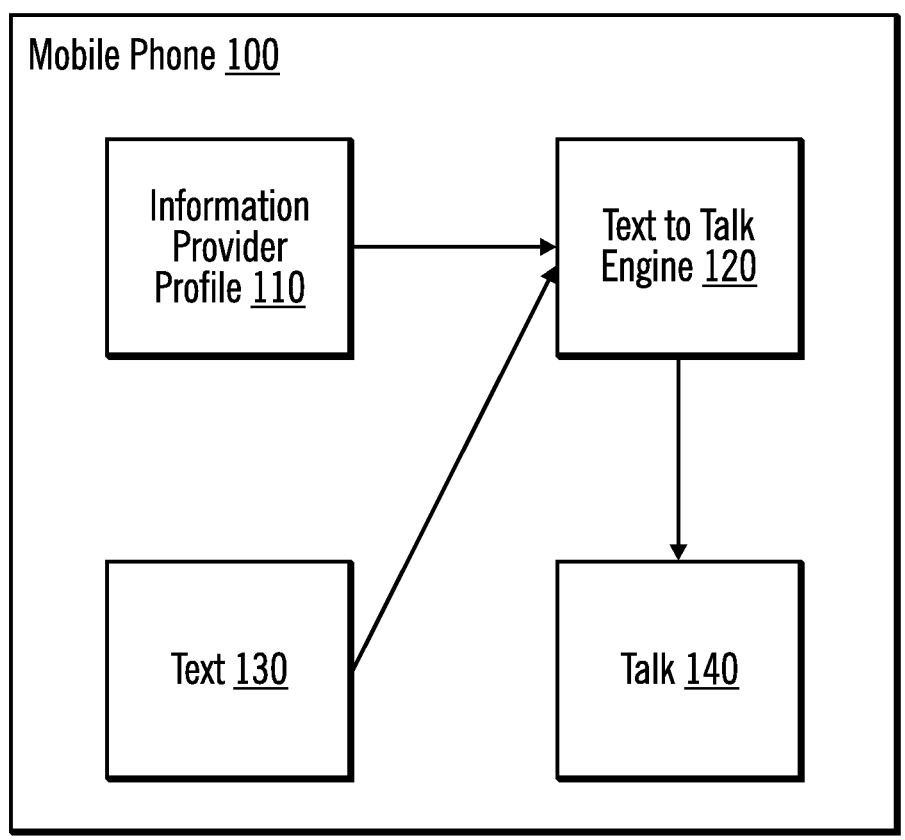
FIG. 1 illustrates, in a block diagram, a computing environment in accordance with certain embodiments.

FIG. 1 illustrates, in a block diagram, a computing environment in accordance with certain embodiments. A mobile phone 100 includes one or more information provider profiles 110, a text to talk engine 120, text, 130, and talk 140. An information provider using the mobile phone 100 is in communication with a receiver (e.g., on another mobile phone or on a desk phone).

In certain embodiments, the mobile phone 100 is a smartphone, a cell phone, a tablet computer with phone capability that is able to host applications, etc.

In certain embodiments, one of the information provider profiles is a default information provider profile. In certain embodiments, an information provider may select an information provider profile 110 for use for a particular, conversation or for a particular period of time.

In certain embodiments, the text to talk engine 120 receives text 130 (e.g., a text message typed by an information provider using the mobile phone 100) and converts the text 130 into talk 140 using the user profile 110. The talk 140 is sent via the mobile phone 100 to an information requester.

In certain embodiments, the text to talk engine 120 provides a new feature for the mobile phone 100 by providing a text talk feature on the mobile phone display screen when a phone call is active with the mobile phone 100.

Communication over the mobile phone 100 is often a preferred way to do all types of business communications. For example, communication over the mobile phone 100 may be used for Business to Business (B2B) communication, where deals are discussed and finalized on the mobile phone 100. As another example, communication over the mobile phone 100 may be used by a credit card company, a bank or an insurance company providing services to their retail customers over the mobile phone 100. As yet another example, communication over the mobile phone 100 may be used for communication between two employees of an organization discussing confidential information (e.g., bid details or customer requirements).

In a first example use case, first speaker (e.g., a sales manager) from an organization is discussing a contract bid with a senior manager from a customer location. It is possible that a representative from a competing business may overhear this information about the contract bid and jeopardize the chances of the organization winning the contract. However, the text to talk feature avoids revealing information about the contract bid.

In a second example use case, a second speaker has lost a credit card at an airport and is trying to call the credit card company to deactivate the lost credit card. The credit card company representative may request personal security information from the second speaker to confirm the second speaker's identity. The second speaker needs to share this confidential information verbally over the mobile phone 100 to continue the procedure. As the second speaker is at the airport, a public place, there is a chance that someone overhears this confidential information and may use the confidential information to commit identity theft. However, the text to talk feature avoids revealing the personal security information.

In a third example use case, a third speaker is at a mall. The third speaker receives a verification call from a health insurance company as part of a health insurance renewal procedure. An insurance company representative is asking for personal, confidential information about the third speaker's health in context with the health insurance. As the third speaker is in a public place, there is a chance that someone overhears this personal, confidential information and may use the personal, confidential information for medical identity theft or other use that would cause problems for the third speaker. However, the text to talk feature avoids revealing the personal, confidential information.

These example use cases highlight the advantages of the text to talk feature to avoid verbally discussing confidential information when there is a lack of privacy in a public place.

In these example use cases, the time to communicate is important, and the speakers are not able to delay the conversations (e.g., to win a bid, prevent losses by misuse of credit card or renewing health insurance), so the text to talk allows sharing confidential information while in a public place.

Figure 2:
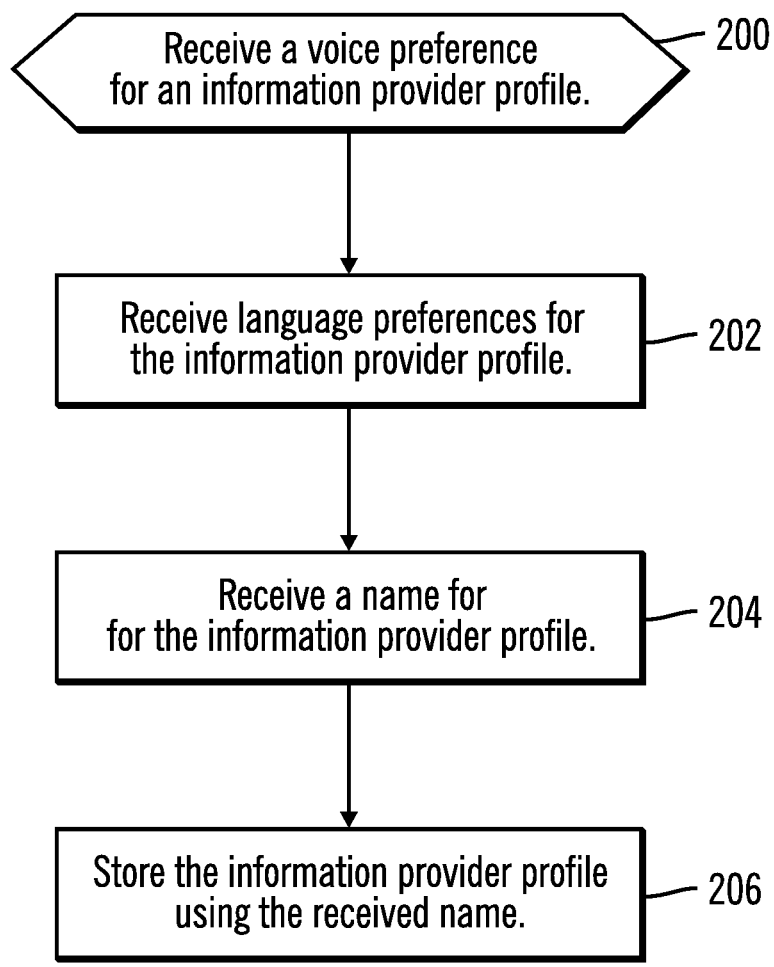
FIG. 2 illustrates, in a flowchart, operations for creating an information provider profile in accordance with certain embodiments.

FIG. 2 illustrates, in a flowchart, operations for creating an information provider profile in accordance with certain embodiments. Control begins at block 200 with the text to talk engine 120 receiving a voice preference for the information provider profile. In certain embodiments, the voice preference indicates that the text should be spoken in either the information provider's voice or in a neutral voice. In certain embodiments, the voice preference also indicates whether the neutral voice is to be a male voice or a female voice. In other embodiments, the neutral voice is gender neutral. In certain embodiments, the text to talk engine 120 is provisioned to learn the information provider's voice. In certain embodiments, the text to talk engine 120 stores information to be able to speak the text in either the information provider's voice or in a neutral voice.

In block 202, the text to talk engine 120 receives language preferences for the information provider profile. In certain embodiments, the language preferences include 1) a language selection for typing text, numbers, dates, etc., 2) a language selection for speaking the voice message, and 3) a language preference for translation. The language preference for translation may be an authentic language translation option (automatic/manual), such as indicating that a month name in English is January and is to be translated into and spoken in Spanish as enero. Also, the language selection may indicate: English, Hindi, German, etc.

In block 204, the text to talk engine 120 receives a name for the information provider profile. In certain embodiments, one information provider may have multiple information provider profiles.

In block 206, the text to talk engine 120 stores the information provider profile using the received name.

Figure 3A:
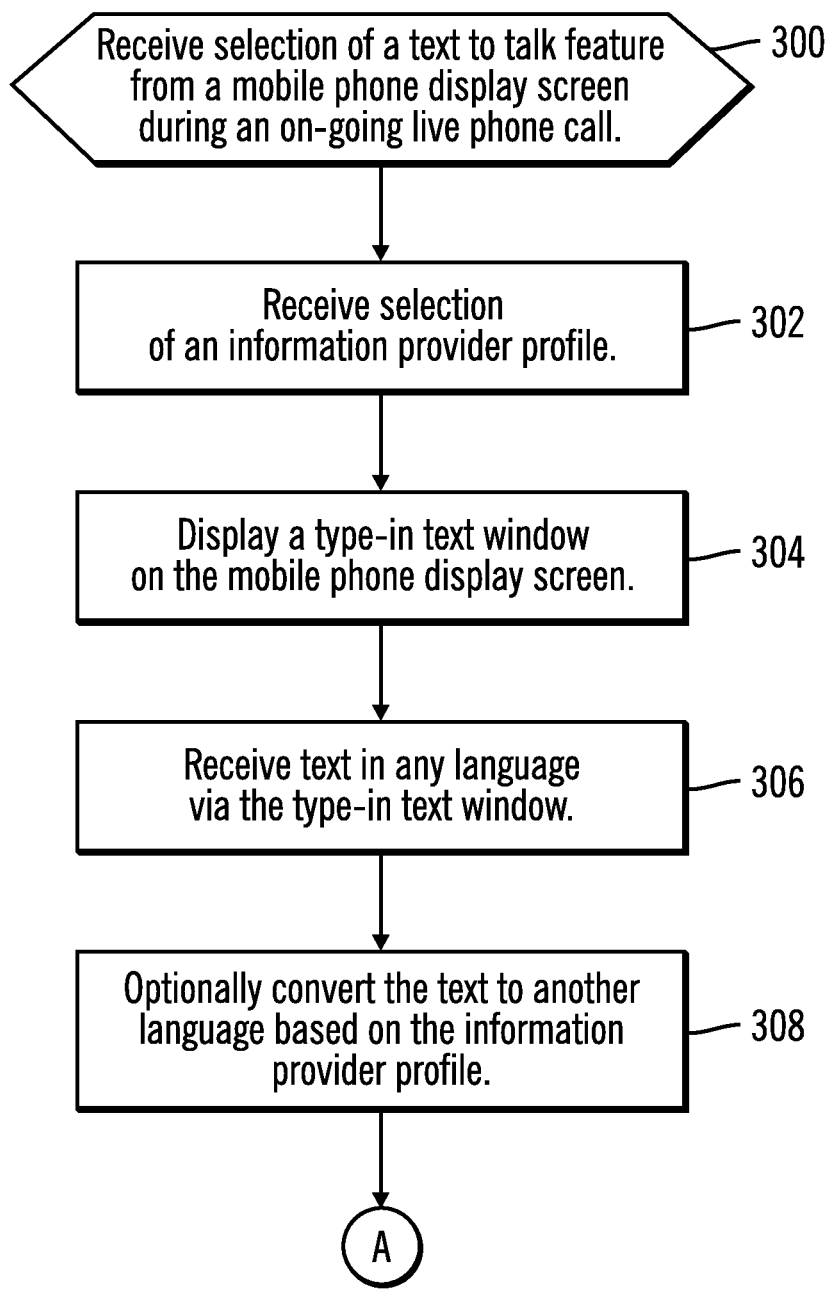
FIGS. 3A and 3B illustrate, in a flowchart, operations for using a text talk feature in accordance with certain embodiments.
Figure 3B:
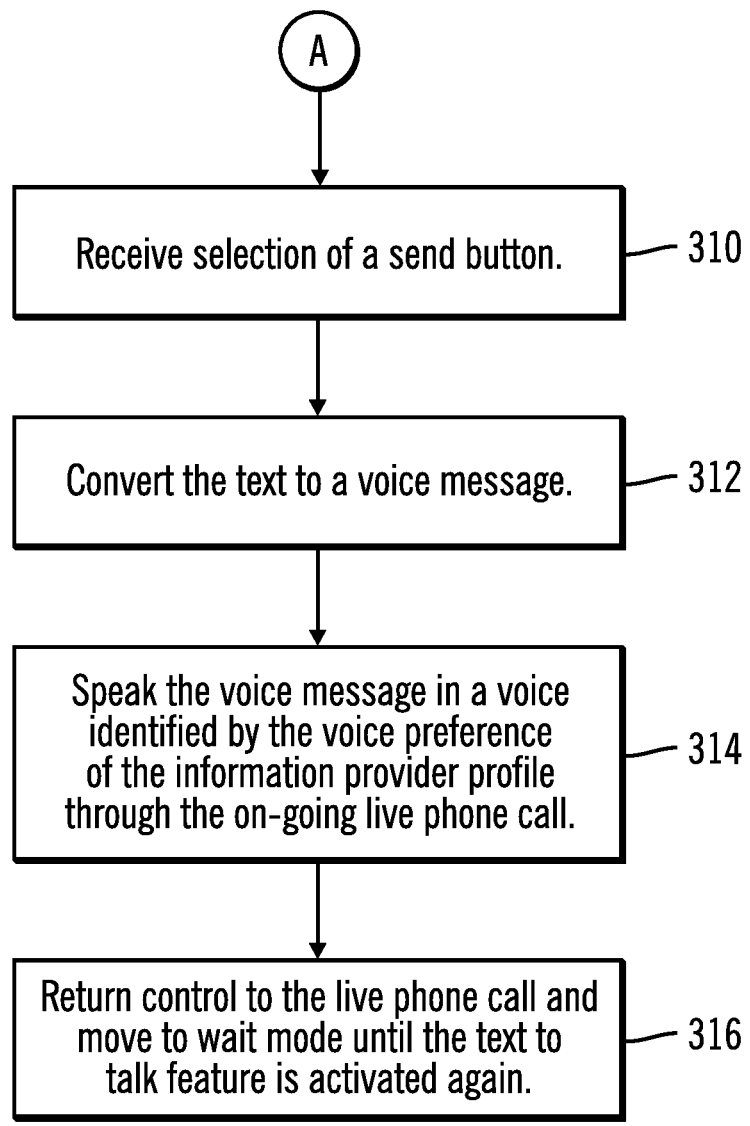

FIGS. 3A and 3B illustrate, in a flowchart, operations for using a text talk feature in accordance with certain embodiments. Control begins at block 300 with the text to talk engine 120 receiving selection of a text to talk feature from a mobile phone display screen during an on-going live phone call. An on-going live phone call may be described as a voice communication between the mobile phone and another device in which the information provider (using the mobile phone) and the information requester (using another device, such as another mobile phone or desk phone) are speaking to each other. In block 302, the text to talk engine 120 receives selection of an information provider profile. In certain embodiments, a default information provider profile is used when the text to talk engine 120 does not receive selection of an information provider profile. In certain embodiments, the text to talk engine 120 receives selection of an information provider profile when the mobile phone is powered on. In certain embodiments, if the information provider profile is not available for the information provider, the text to talk engine 120 will use the mobile phone's locale settings (e.g., the text to talk engine 120 may use the mobile phone's location to determine a language selection for typing text and speaking the voice message).

In block 304, the text to talk engine 120 displays a type-in text window on the mobile phone display screen. In block 306, the text to talk engine 120 receives text in any language via the type-in text window.

In block 308, the text to talk engine 120 converts the text to another language based on the information provider profile. In certain embodiments, if the language of the text received in the type-in text window is different from the language preference in the information provide profile, then the text to talk engine 120 converts the text from the language in which the text was received to the language specified by the language preference. From block 308 (FIG. 3A), processing continues to block 310 (FIG. 3B).

In block 310, the text to talk engine 120 receives selection of a send button.

In block 312, the text to talk engine 120 converts the text to a voice message.

In block 314, the text to talk engine 120 speaks the voice message in a voice identified by the voice preference of the information provider profile through the on-going live phone call for the requester (caller-R).

In block 316, the text to talk engine 120 returns control to the live phone call and moves to wait mode until the text talk feature is activated again. Thus, during a live phone call, the information provider may either speak or select the text to talk feature at any time and may switch between these during the live phone call.

Figure 4:
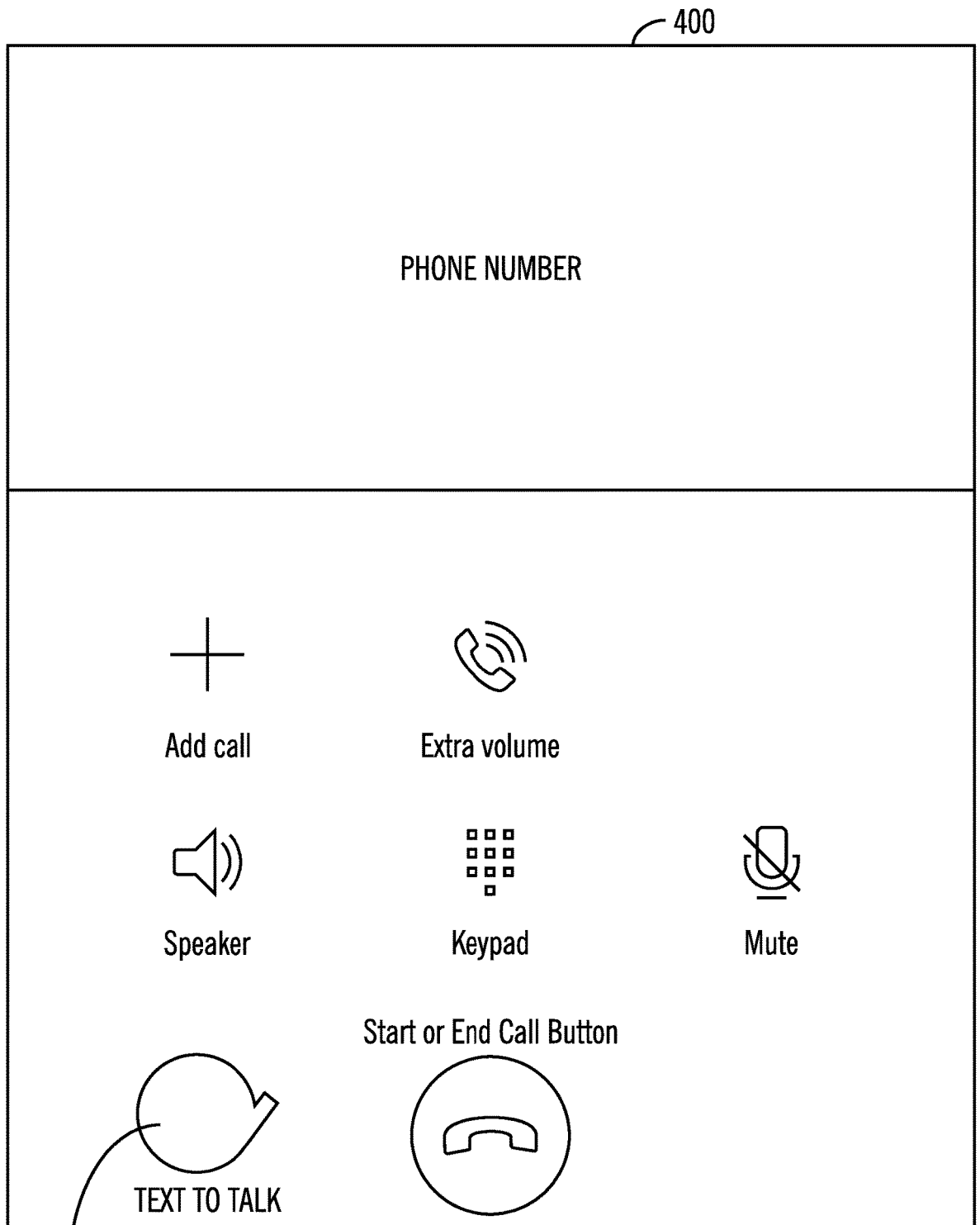
FIG. 4 illustrates a text talk feature on a mobile phone display screen in accordance with certain embodiments.

FIG. 4 illustrates a text talk feature 410 on a mobile phone display screen 400 in accordance with certain embodiments. Although the mobile phone display screen 400 illustrates functions for adding a call, adding extra volume, speaker keypad, mute, starting or ending a call, in various embodiments, the text talk feature 410 may be provided with any combination of these or other functions.

Figure 5:
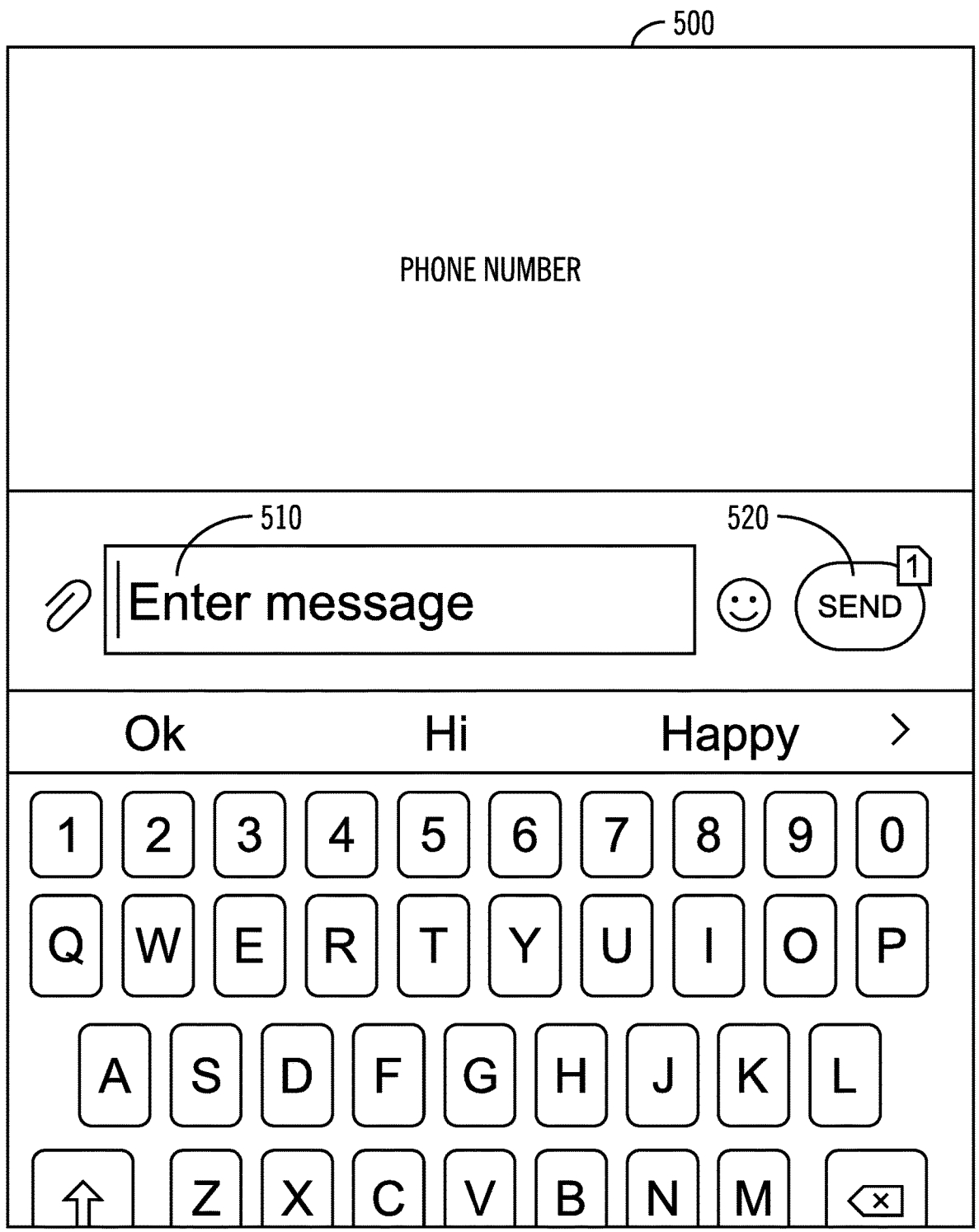
FIG. 5 illustrates a type-in text window that is displayed in response to receiving selection of a text talk feature in accordance with certain embodiments.

FIG. 5 illustrates a type-in text window that is displayed in response to receiving selection of a text talk feature in accordance with certain embodiments. Once the text talk feature 410 (FIG. 4) is selected, the text to talk engine 120 displays the type-in text window 510 and the send button 520 in the mobile phone display screen 500.

Figure 6:
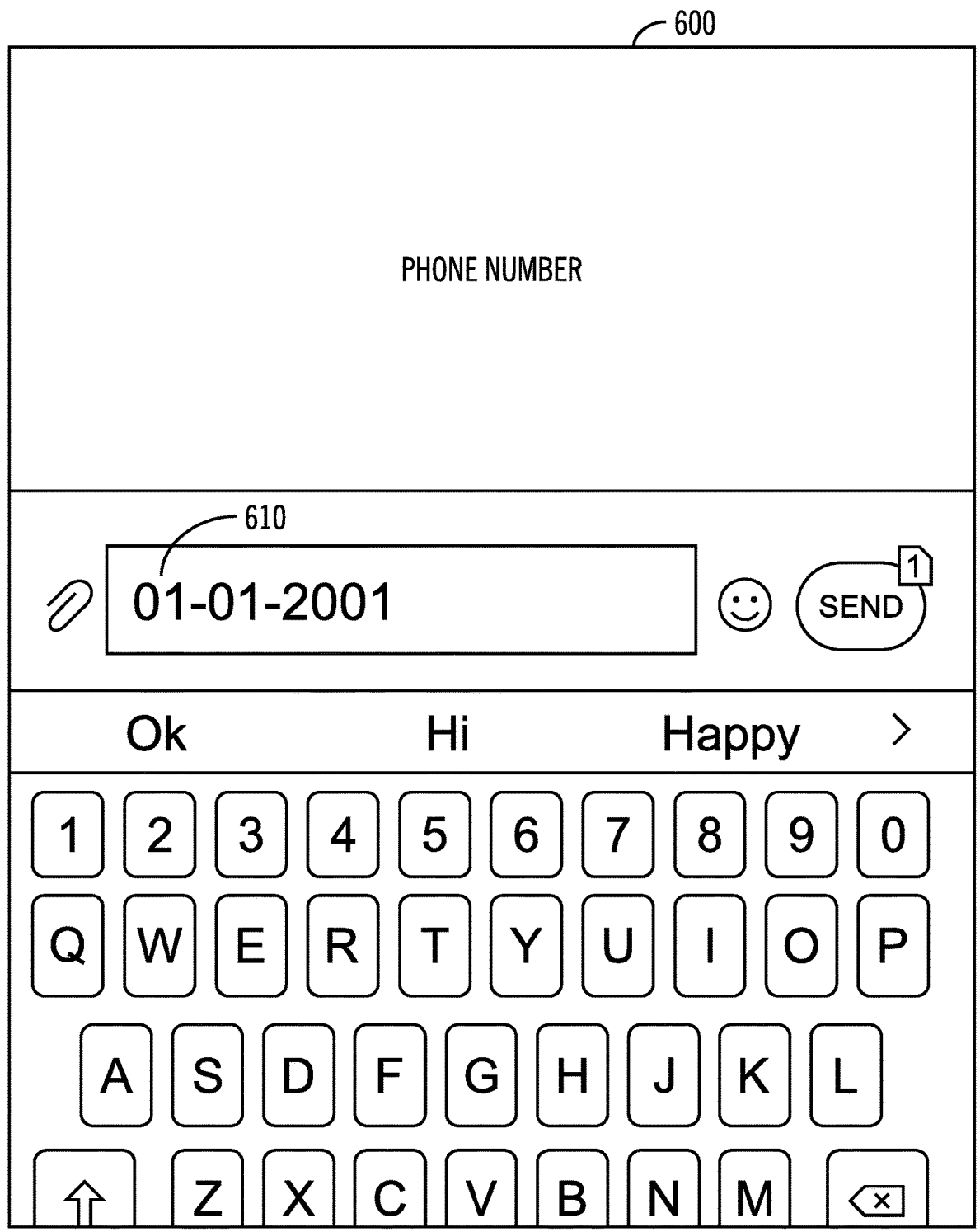
FIG. 6 illustrates receipt of text in accordance with certain embodiments.

FIG. 6 illustrates receipt of text 610 in accordance with certain embodiments. Once the type-in text window is displayed, the information provider types in text 610.

Figure 7:
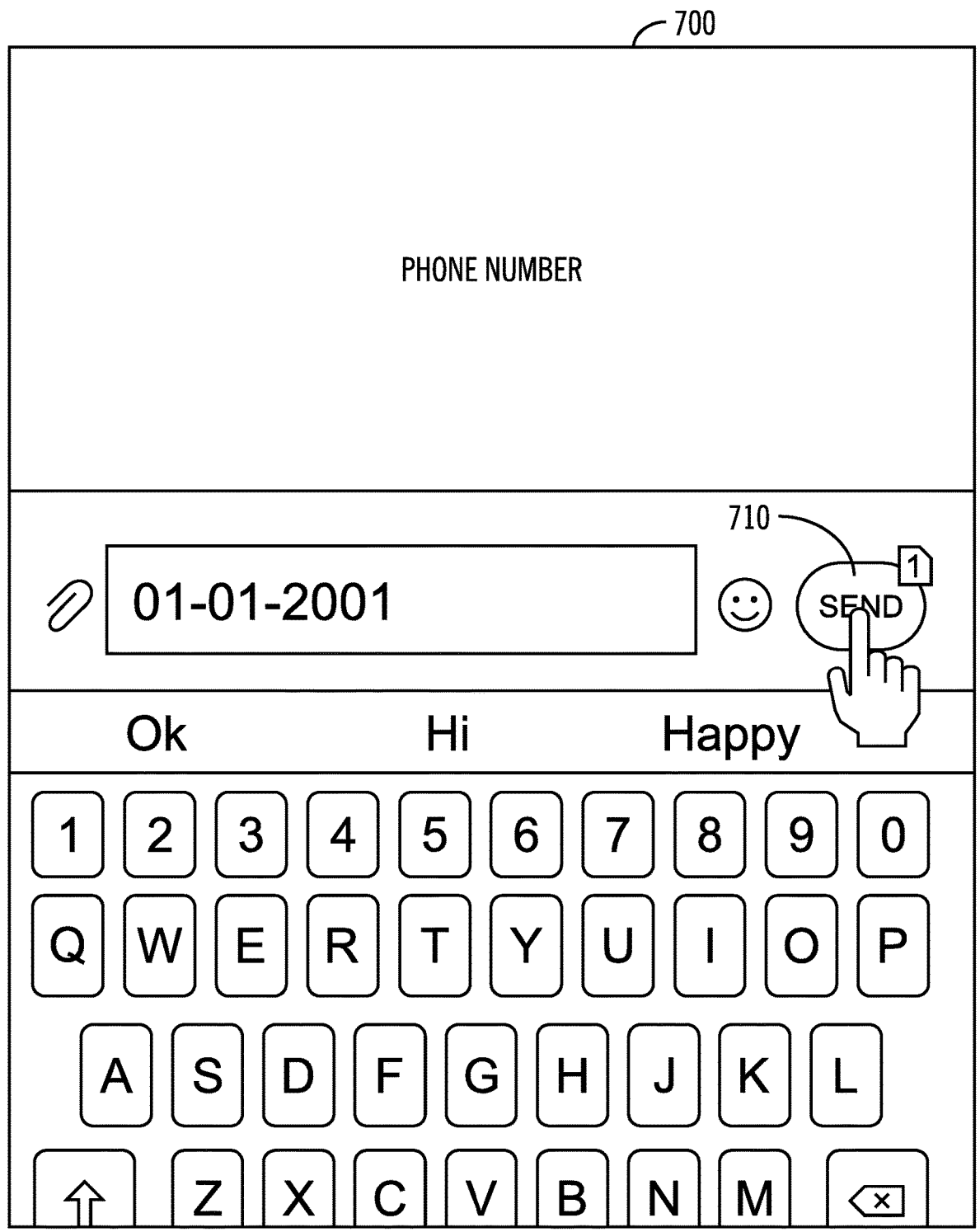
FIG. 7 illustrates selection of a send button in accordance with certain embodiments.

FIG. 7 illustrates selection of the send button 710 in accordance with certain embodiments. Once the information provider is satisfied with the text, the information provider selects the send button 710 in the mobile phone display screen 700.

Thus, with embodiments, the text to talk engine 120 brings up a type-in text window to receive text (e.g., a text response to a question from an information requester). The text to talk engine 120 accepts the text in any language from the information provider. The text to talk engine 120 transform the text message into either a neutral regional accent in either a male or female voice or into the information provider's voice.

The text to talk engine 120 introduces the information provider profile (e.g., a phone device configuration) to learn preferred voice and language options. The text to talk engine 120 is provisioned to have ability to switch the voice and language options based on the information provider profile.

The text to talk engine 120 provides a send button, and, when the send button is selected, the text to talk engine 120 converts text to voice and sends ("speaks") the converted voice message as part of the ongoing call to the information requester. The information requester may ask for additional confidential information, and the information provider may select the text talk feature to provide additional confidential information. Otherwise, the phone call may continue with voice communication between the information requester and the information provider.

The text to talk engine 120 provides privacy. For example, the information provided by text is fully confidential (as it is more difficult for others to see the text than to hear someone speaking the same information). The text to talk engine 120 receives text and converts the text into a human voice, and, as a result, no one has overheard this confidential information.

Interactive Voice Responses (IVRs) may be used for predefined, limited, and shorter workflows, where options/selections for the speaker may be limited. For example, with an IVR, a customer care representative talking to a customer is able to allow the customer to key in predefined, structured information (e.g., a credit card number). Unlike IVRs that may not be suitable in some use cases as the questions asked or topics discussed may be different or customized based on the use case, embodiments allow any topics or questions to be raised.

The text to talk engine 120 provides freedom because, unlike IVR systems, the information requester may request any information. That is, embodiments are not limited to asking for preset information or information identified before the call is started. Thus, embodiments allow the information requester the freedom to customize questions.

Unlike systems that protect communication over mobile phones using encryption to protect confidentiality once confidential information is verbally communicated, the text to talk feature avoids a speaker sharing confidential information verbally in a public place.

The text to talk engine 120 avoids a delay in responding to the information requester. That is, the information requester and the information provider do not need to postpone the communication when they are in public places and want to avoid speaking confidential information. Instead, the information requester and the information provider may communicate anytime and anywhere.

The text to talk engine 120 enables real-time talking. That is, the text to talk engine 120 provides confidential information in information providers own voice to provide a real time feeling and make the communication natural.

Embodiments provide a solution that enables sharing confidential information by receiving text, transforming the text into a human interpretation voice message, delivering the voice message to the information requester by narrating the voice message. The voice message may be a number, date or any language-based sentence.

Merely to enhance understanding of embodiments, examples are provided herein. For example, an information provider calls an information requester.

A first use case example is a customer care service calling use case. In this first use case example, a customer care executive asks an information provider some account security information at a time when the information provider has lost a credit card at the airport (e.g., because a wallet containing the credit card was lost). The information provider wishes to block use of this credit card immediately, and the information provider does not want to allow anyone to do passive listening and hear the credit card number. In this first use case example, the information provider may type the credit card number and other information for conversion to a voice message with privacy.

In a second use case example, a bid manager seeks some clarification on a terms and conditions provided by a business manager, and the clarification does not turn up clearly in emails or in a bid paper. The bid manager wants to discuss this over the phone with privacy so that the business manager may provide confidential key numbers and other confidential information.

With embodiments, the text talk feature works with an information provider configuring settings in an information provider profile. For example, the information provider configures a voice option to let the text to talk engine 120 know whether to choose a neutral voice or the information provider's own voice while using the text talk feature. If the information provider selects the own voice option, the information provider may provide a voice sample to let the text to talk engine 120 learn the voice.

With embodiments, either the information requester may initiate a call to the information provider or the information provider may initiate a call to the information requester. In either case, the information requester requests confidential information (e.g., a date of birth). The information provider, who does not want to speak the confidential information, may indicate by speaking that the confidential information will be shared using the text talk feature, and the information requester may verbally agree with this.

Then, the information provider selects the text to talk feature, which is active on the mobile phone display screen. The text to talk engine 120 provides a key board interface to type in the information. The information provider enters information and selects the send button. Then, the text to talk engine 120 transforms the message into a voice message, adds the voice message to the ongoing call, and sends the voice message to the information requester. The information requester hears the voice message as if the information provider were speaking. The information requester listens to the confidential information along with the information provider. The information requester may verify the confidential information or continue with the call.

Embodiments provide a solution that allows use of a mobile phone (rather than a separate device) to text confidential information while a phone call is on-going between an information requestor and an information provider.

Embodiments provide the text to talk feature to mimic a speaker's voice on a mobile phone for a real time talking experience.

Figure 8:
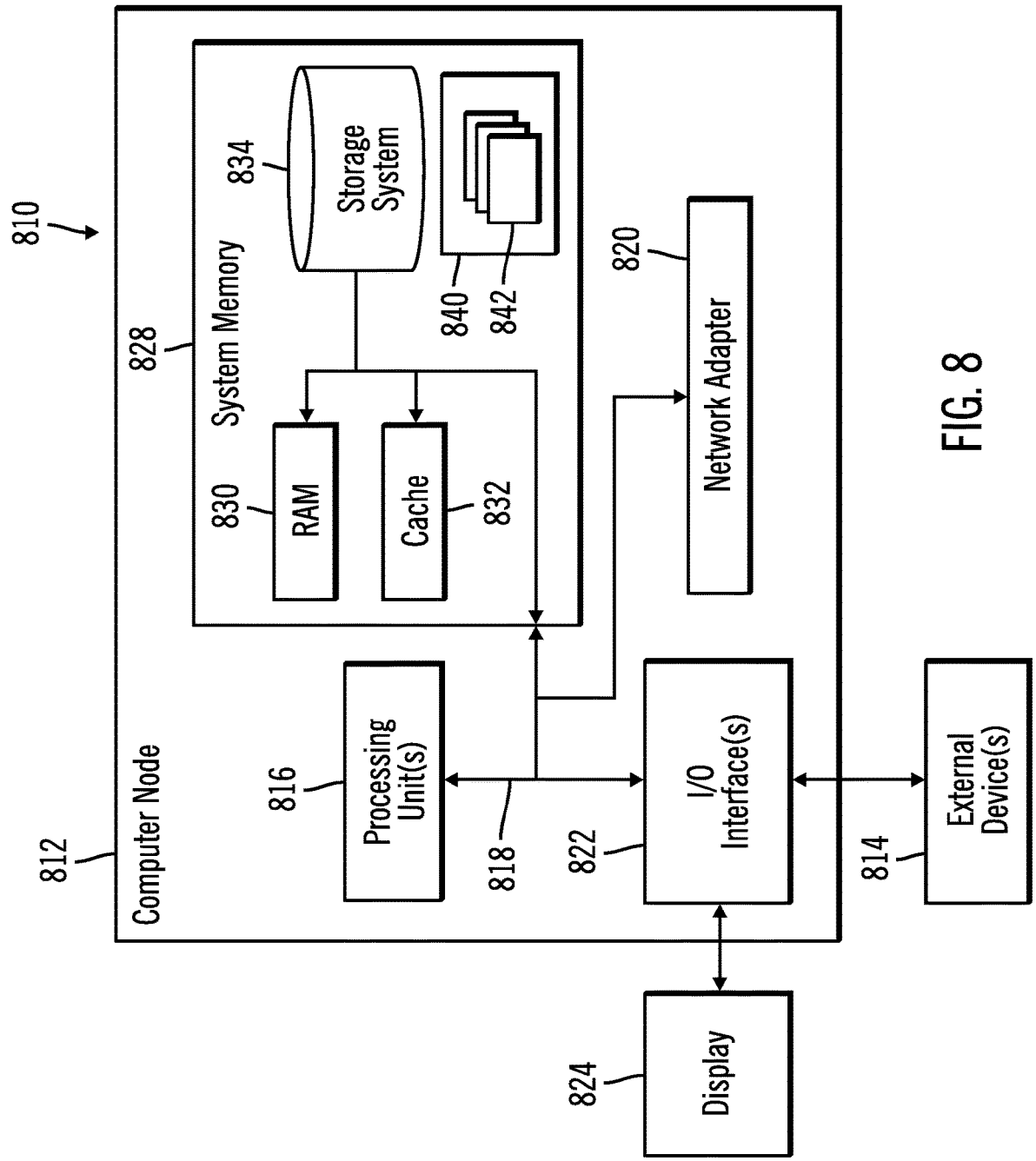
FIG. 8 illustrates a computing node in accordance with certain embodiments.

FIG. 8 illustrates a computing environment 810 in accordance with certain embodiments. In certain embodiments, the computing environment is a cloud computing environment. Referring to FIG. 8, computer node 812 is only one example of a suitable computing node and is not intended to suggest any limitation as to the scope of use or functionality of embodiments of the invention described herein. Regardless, computer node 812 is capable of being implemented and/or performing any of the functionality set forth hereinabove.

The computer node 812 may be a computer system, which is operational with numerous other general purpose or special purpose computing system environments or configurations. Examples of well-known computing systems, environments, and/or configurations that may be suitable for use with computer node 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 812 may be described in the general context of computer system executable instructions, such as program modules, being executed by a computer system. Generally, program modules may include routines, programs, objects, components, logic, data structures, and so on that perform particular tasks or implement particular abstract data types. Computer node 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer node 812 is shown in the form of a general-purpose computing device. The components of computer node 812 may include, but are not limited to, one or more processors or processing units 816, a system memory 828, and a bus 818 that couples various system components including system memory 828 to one or more processors or processing units 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 812 typically includes a variety of computer system readable media. Such media may be any available media that is accessible by computer node 812, and it includes both volatile and non-volatile media, removable and non-removable media.

System memory 828 can include computer system readable media in the form of volatile memory, such as random access memory (RAM) 830 and/or cache memory 832. Computer node 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, system memory 828 may include at least one program product having a set (e.g., at least one) of program modules that are configured to carry out the functions of embodiments of the invention.

Program/utility 840, having a set (at least one) of program modules 842, may be stored in system memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer node 812 may also communicate with one or more external devices 814 such as a keyboard, a pointing device, a display 824, etc.; one or more devices that enable a user to interact with computer node 812; and/or any devices (e.g., network card, modem, etc.) that enable computer node 812 to communicate with one or more other computing devices. Such communication can occur via Input/Output (I/O) interfaces 822. Still yet, computer node 812 can communicate with one or more networks such as a local area network (LAN), a general wide area network (WAN), and/or a public network (e.g., the Internet) via network adapter 820. As depicted, network adapter 820 communicates with the other components of computer node 812 via bus 818. It should be understood that although not shown, other hardware and/or software components could be used in conjunction with computer node 812. Examples, include, but are not limited to: microcode, device drivers, redundant processing units, external disk drive arrays, RAID systems, tape drives, and data archival storage systems, etc.

In certain embodiments, the mobile phone 100 includes the architecture of computer node 812. In certain embodiments, the mobile phone 100 is part of a cloud infrastructure (e.g., and may send text to a cloud node to apply the text to talk feature). In certain alternative embodiments, the mobile phone 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
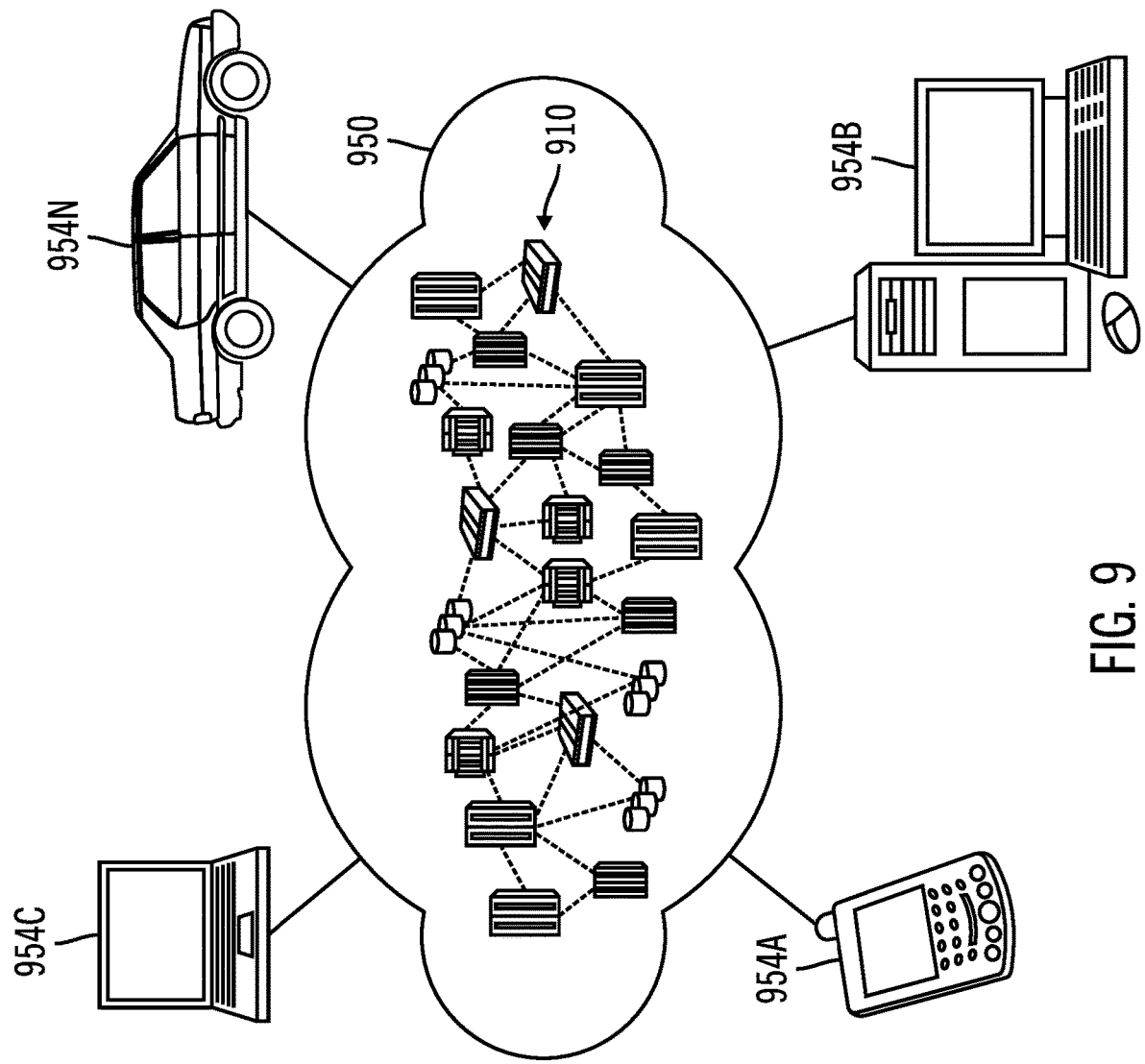
FIG. 9 illustrates a cloud computing environment in accordance with certain embodiments.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
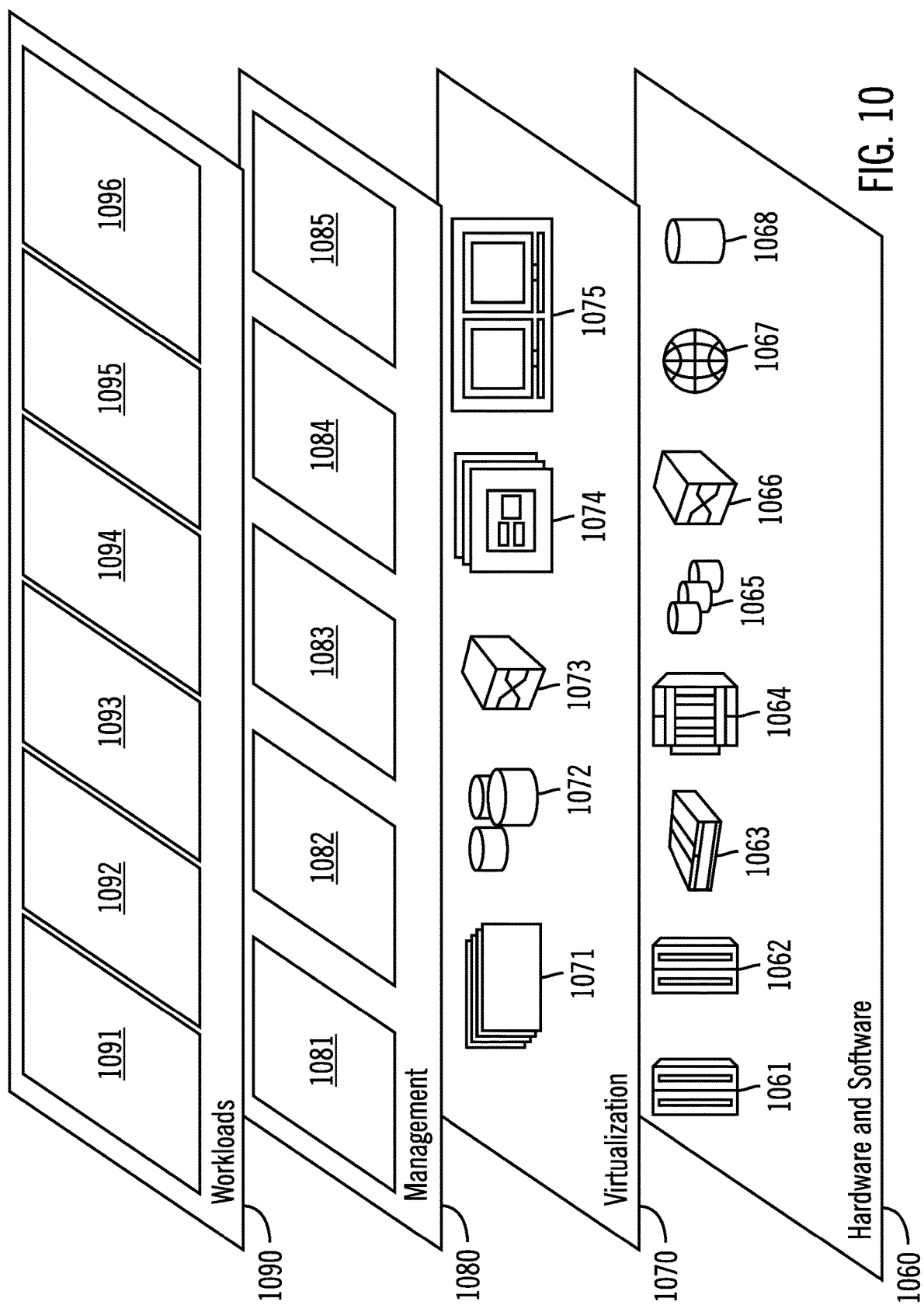
FIG. 10 illustrates abstraction model layers in accordance with certain embodiments.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and sharing confidential information with privacy using a mobile phone 1096.

Thus, in certain embodiments, software or a program, implementing sharing confidential information with privacy using a mobile phone in accordance with embodiments described herein, is provided as a service for converting text to talk in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description provides examples of embodiments of the invention, and variations and substitutions may be made in other embodiments.

What is claimed is:

1. A computer-implemented method of a mobile phone, comprising:
   storing a plurality of information provider profiles for an information provider on the mobile phone; and
   during an on-going live phone call between the information provider and an information requester,
   receiving selection of a text to talk feature from a mobile phone display screen of the mobile phone;
   receiving selection of an information provider profile from the plurality of information provider profiles, wherein the information provider profile indicates a voice preference and language preferences, wherein the language preferences include a first language for typing text and a second language for speaking the text;
   displaying a type-in text window on the mobile phone display screen;
   receiving text in the type-in text window in the first language, wherein the text includes confidential information;
   converting the text in the first language to text in the second language;
   converting the text in the second language to a voice message;
   speaking the voice message in a voice identified by the voice preference through the on-going live phone call to provide the confidential information with privacy; and
   returning control to the on-going live phone call.

2. The computer-implemented method of claim 1, wherein the voice preference indicates one of a voice of the information provider and a neutral voice, and wherein for the neutral voice, the voice preference indicates one of a male voice and a female voice.

3. The computer-implemented method of claim 1, wherein the text to talk feature is provided as a new feature of the mobile phone.

4. The computer-implemented method of claim 1, wherein the confidential information is requested using the text to talk feature.

5. The computer-implemented method of claim 1, wherein a Software as a Service (SaaS) is configured to perform method operations.

6. A computer program product, the computer program product comprising a computer readable storage medium having program code embodied therewith, the program code executable by at least one processor of a mobile phone to perform:
    storing a plurality of information provider profiles for an information provider on the mobile phone; and
    during an on-going live phone call between the information provider and an information requester,
        receiving selection of a text to talk feature from a mobile phone display screen of the mobile phone;
        receiving selection of an information provider profile from the plurality of information provider profiles, wherein the information provider profile indicates a voice preference and language preferences, wherein the language preferences include a first language for typing text and a second language for speaking the text;
        displaying a type-in text window on the mobile phone display screen;
        receiving text in the type-in text window in the first language, wherein the text includes confidential information;
        converting the text in the first language to text in the second language;
        converting the text in the second language to a voice message;
        speaking the voice message in a voice identified by the voice preference through the on-going live phone call to provide the confidential information with privacy; and
        returning control to the on-going live phone call.

7. The computer program product of claim 6, wherein the voice preference indicates one of a voice of the information provider and a neutral voice, and wherein for the neutral voice, the voice preference indicates one of a male voice and a female voice.

8. The computer program product of claim 6, wherein the text to talk feature is provided as a new feature of the mobile phone.

9. The computer program product of claim 6, wherein the confidential information is requested using the text to talk feature.

10. The computer program product of claim 6, wherein a Software as a Service (SaaS) is configured to perform computer program product operations.

11. A computer system of a mobile phone, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more computer-readable memories, to perform operations comprising:
    storing a plurality of information provider profiles for an information provider on the mobile phone; and
    during an on-going live phone call between the information provider and an information requester,
        receiving selection of a text to talk feature from a mobile phone display screen of the mobile phone;
        receiving selection of an information provider profile from the plurality of information provider profiles, wherein the information provider profile indicates a voice preference and language preferences, wherein the language preferences include a first language for typing text and a second language for speaking the text;
        displaying a type-in text window on the mobile phone display screen;
        receiving text in the type-in text window in the first language, wherein the text includes confidential information;
        converting the text in the first language to text in the second language;
        converting the text in the second language to a voice message;
        speaking the voice message in a voice identified by the voice preference through the on-going live phone call to provide the confidential information with privacy; and
        returning control to the on-going live phone call.

12. The computer system of claim 11, wherein the voice preference indicates one of a voice of the information provider and a neutral voice, and wherein for the neutral voice, the voice preference indicates one of a male voice and a female voice.

13. The computer system of claim 11, wherein the text to talk feature is provided as a new feature of the mobile phone.

14. The computer system of claim 11, wherein the confidential information is requested using the text to talk feature.

15. The computer system of claim 11, wherein a Software as a Service (SaaS) is configured to perform computer system operations.

* * * * *